(12) United States Patent
Andreev et al.

(10) Patent No.: US 6,785,699 B1
(45) Date of Patent: Aug. 31, 2004

(54) PREFIX COMPARATOR

(75) Inventors: Alexander E. Andreev, San Jose, CA (US); Ranko Scepanovic, San Jose, CA (US)

(73) Assignee: LSI Logic Corporation, Milpitas, CA (US)

( * ) Notice: Subject to any disclaimer, the term of this patent is extended or adjusted under 35 U.S.C. 154(b) by 530 days.

(21) Appl. No.: 09/862,000

(22) Filed: May 4, 2001

(51) Int. Cl.[7] .......................... G06F 7/00; G06F 17/30
(52) U.S. Cl. ........................................ 708/212; 707/3
(58) Field of Search ................................ 708/211, 212, 708/671; 707/3, 4, 5, 6; 711/108

(56) References Cited

U.S. PATENT DOCUMENTS 6,047,283 A * 4/2000 Braun .......................... 707/3
6,505,270 B1 * 1/2003 Voelkel et al. ............. 711/108
6,614,789 B1 * 9/2003 Yazdani et al. ............. 370/392
6,633,548 B2 * 10/2003 Bachmutsky et al. ....... 370/255

* cited by examiner

Primary Examiner—Chuong Dinh Ngo
(74) Attorney, Agent, or Firm—Westman, Champlin & Kelly

(57) ABSTRACT

A longest common subprefix of two binary words p1 and p2 is identified based on bit strings ip1 and ip2 which are extensions of p1 and p2, and binary words n1 and n2 that define the length of p1 and p2. The bit strings and words are processed to set a "greater" output if p1>p2 and to set an "equal" output if p1=p2. A mask having a consecutive string of most significant bits having a first logical value is constructed to identify the matching subprefixes of p1 and p2.

20 Claims, 2 Drawing Sheets

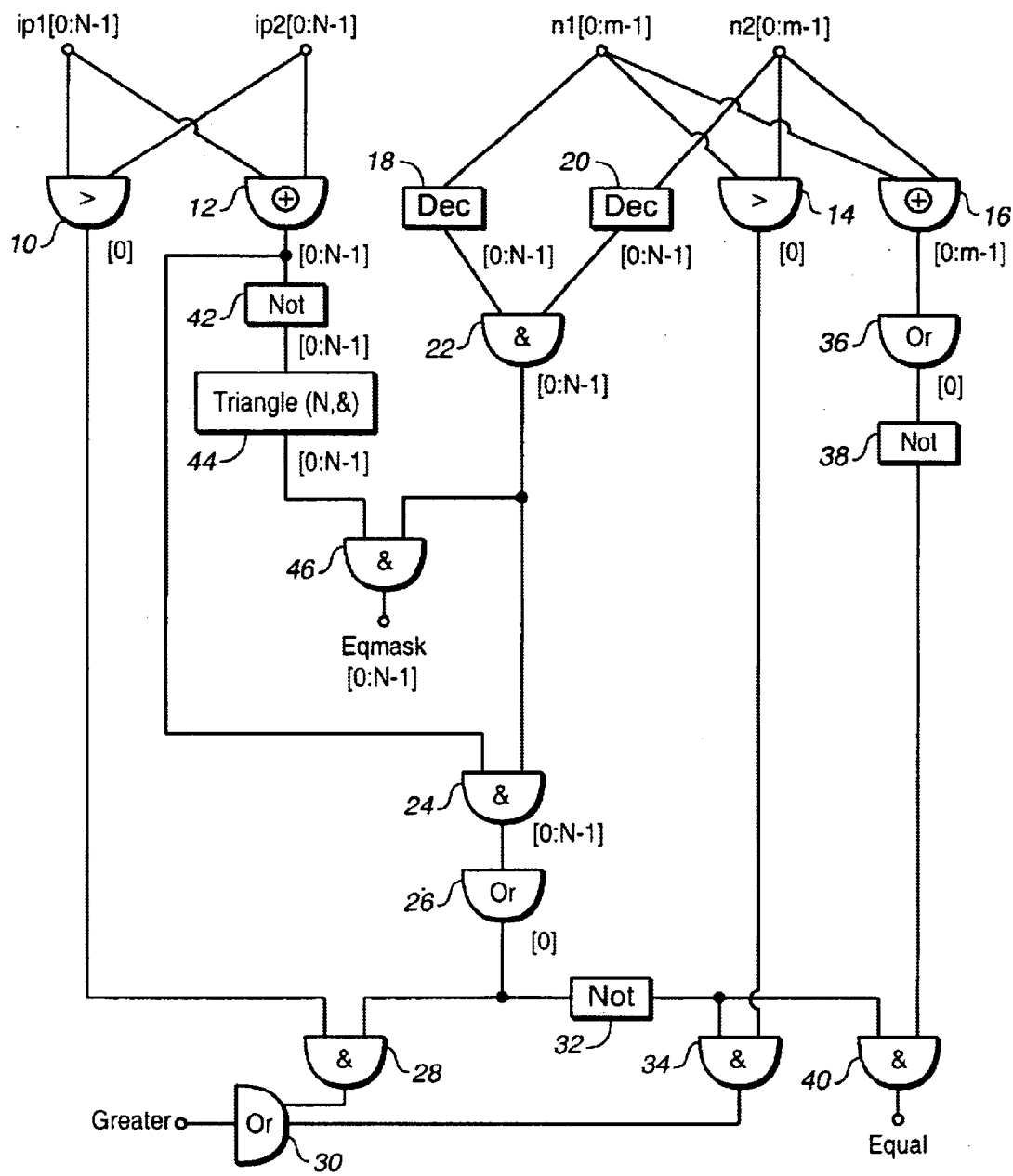
FIG._1

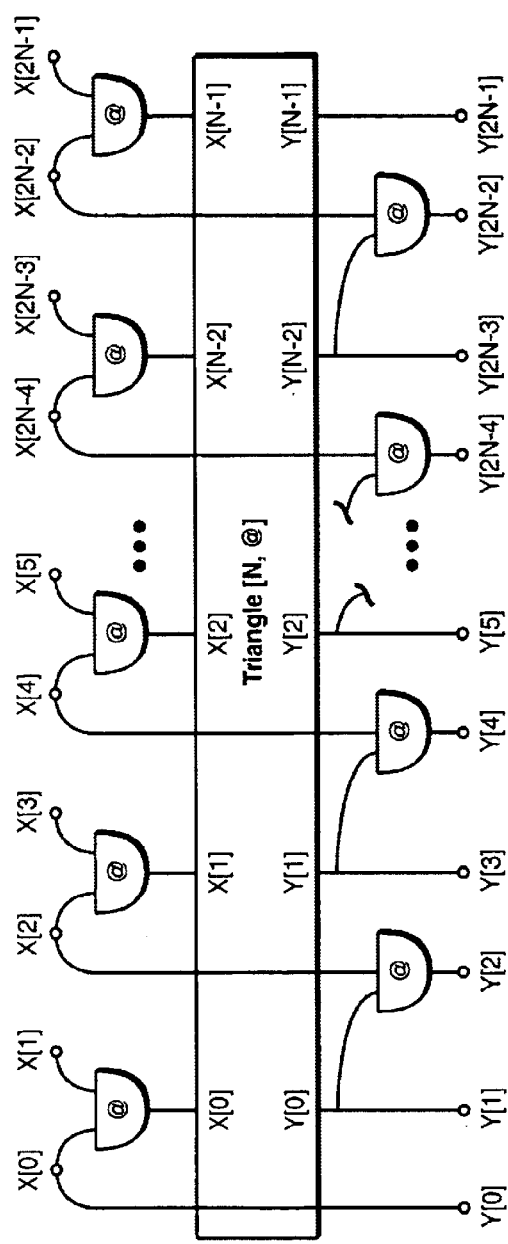

PREFIX COMPARATOR

CROSS REFERENCE TO RELATED APPLICATIONS

The present application is related to U.S. application Ser. No. 09/679,209 filed Oct. 4, 2000 for "Fast Flexible Search Engine for Longest Prefix Match" and U.S. application Ser. No. 09/679,313 filed Oct. 4, 2000 for "Flexible Search Engine having Sorted Binary Search Tree for Perfect Match", both by Alexander A. Andreev and Ranko Scepanovic and assigned to the same Assignee as the present invention, both of which are specifically incorporated herein by reference.

FIELD OF THE INVENTION

This invention relates to search engines, and particularly to prefix comparators that identify common subprefixes of two prefixes.

BACKGROUND OF THE INVENTION

In application Ser. No. 09/679,313 we describe flexible search engine for a sorted binary search tree for perfect matching. The search tree is used for searching large databases, such as integrated circuit cell libraries. In application Ser. No. 09/679,209, we describe a prefix search tree that identifies the longest common subprefix of two prefixes. The prefix search tree is useful in a sorted binary search tree, such as that described in application Ser. No. 09/679,313 to perform search functions.

As described in application Ser. No. 09/679,209, the prefixes have values based on two rules: First, a bit string A is smaller in value than a bit string AB (AB>A), where bit string B contains at least one finite bit. Thus, if A is "1101" and B is "110", AB is "1101110" which is greater than "1101". Second, where two bit strings have the same length, a bit string A1B, comprising bit string A followed by binary "1" and a bit string B, is greater in value than the same bit string A followed by binary "0" and bit string C, regardless of the values of B and C. Thus, A1B>A0C. Thus if A is "1101", B is "000", and C is "110", A1B is "11011000" and A0C is "11010110" and 11011000>11010110.

The prefix search tree of application Ser. No. 09/679,209 employs a mask that defines one or more common subprefixes between a binary search prefix and the binary prefixes in the vertices of the tree. A mask is derived for each prefix in the tree based on an ordered comparison of the prefix at the vertex and the search prefix. The masks are used for searching the prefix tree to find the prefix in the tree with longest matching subprefix to the search prefix.

Generation of the masks in application Ser. No. 09/679,209 requires considerable memory and processing allocation. The present invention is in an improved prefix comparator that significantly improves the performance of the mask generation.

SUMMARY OF THE INVENTION

In accordance with the invention, a longest common subprefix of two binary prefixes p1 and p2 is identified. The prefixes are defined as bit strings ip1 and n1, and ip2 and n2, respectively, where ip1 and ip2 are of equal length and represent the prefixes p1 and p2, and n1 and n2 represent the actual lengths of p1 and p2. Word portions ip1 and ip2 are processed to form a bit string having first bit values corresponding to the matching bits of ip1 and ip2. Word portions n1 and n2 are decoded to define the length of the shortest of the prefixes p1 and p2. The results of the processing of ip1 and ip2 and decoding of n1 and n2 derive a mask having a consecutive string of most significant bits having the first bit value identifying the matching subprefixes of ip1 and ip2.

A preferred aspect of the present invention is the provision of a circuit that performs the functions of the invention. Preferably, the circuit is implemented as a triangle semiconductor device.

Alternatively the present invention may be implemented as a computer readable program that is embedded in a computer usable medium to cause a computer to identify common subprefixes of two binary words and to carry out the processes of the invention.

BRIEF DESCRIPTION OF THE DRAWINGS

FIG. 1 is a block circuit diagram of a prefix comparator in accordance with the present invention.

FIGS. 2 and 3 are illustrations of a triangle semiconductor logic device used in the prefix comparator of the present invention.

DETAILED DESCRIPTION OF THE PREFERRED EMBODIMENTS

The present invention provides an improved prefix comparator for a prefix search tree. Each prefix p of a set PR(W) has a length w, which is smaller than or equal to a predetermined fixed length W ($w \leq W$). Each prefix p is represented by two binary words ip(p) and n(p). The word ip(p) has length of W bits, and is an extension of prefix p. Hence, each word ip(p) has a string of w bits, which is a copy of prefix p, followed by W-w empty bits. The word n(p) is binary representation of the length of the prefix p, expressed as LOG(W). The prefix comparator interface is described by the Verilog code:

```
module PCOMPARE();
input[0:W-1]ip1, ip2;
input[0:m-1]n1, n2;
output greater, equal;
output [0:W-1] eqmask;
endmodule
``` where m=LOG(W+1) and LOG(X) is the closest upper integer to binary logarithm of X.

The pair (ip1, n1) is the code of first input prefix p1, (ip2, n2) is the code of second input prefix p2. If p1>p2, the "greater" output is logical "1"; if p1=p2, the "equal" output is logical "1". The output "eqmask" has binary 1's at the bit positions of each common subprefix of p1 and p2. The least significant "1" bit of the string of "1"s represents the longest common prefix. This output is significant for mask management for the system described in the aforementioned application Ser. No. 09/679,209.

A block diagram of the prefix comparator circuit of the present invention is illustrated in greater detail in FIG. 1. The comparator compares the first input prefix p1 to the second input prefix p2 and provides a logical "1" output at the "greater" output at gate 30 only if p1 is greater than p2. If p1 is equal to p2, the comparator provides a logical "1" output at the "equal" output at gate 40. The comparator also provides an output "eqmask" that has logical "1"s at the bit positions of each common sub-prefix of prefixes p1 and p2. The least significant "1" bit of this string identifies the longest common prefix of p1 and p2. This mask can be used in prefix matching described in application Ser. No. 09/679,209.

The first input prefix, p1, has a code ip1, n1, and the second input prefix, p2, has a code ip2, n2. Each prefix contains w bits, where w may be different for each prefix p1 and p2. Words ip1 and ip2 each contains a preset number of bits, W, where W is the same for each word ip1 and ip2, and W≦w. Consequently, ip1 and ip2 are extensions of the prefixes p1 and p2, respectively, containing a copy of p1 or p2 as the w most significant bits and W-w least significant bits that are preferably "empty" for reasons described in application Ser. No. 09/679,209. Words ip1 and ip2 are input to respective inputs of comparator gate 10 and Exclusive-OR gate 12.

Comparator gate 10 is a comparator that provides a logical "1" output if ip1 is greater than ip2, with the logical "1" output bit corresponding to the bit position of the first, or most significant, bit position where ip1 is greater ip2. For example, if ip1 is "100111" and ip2 is "100110" the five most significant bits of ip2 match those of ip1 and the sixth bit of ip2 is "0" while the sixth bit or ip1 is "1". Hence, comparator gate 10 will provide a logical "1" output at the sixth bit position. However, if the first non-matching bits (e.g., the sixth bits) are such that the ip2 bit is a logical "1" while the corresponding bit of ip1 is a logical "0", gate 10 provides a logical "0" output. Hence, gate 10 provides a "1" output if ip1>ip2 and a "0" output if ip2≧ip1.

Exclusive-OR gate 12 is a bit-wise gate that provides a logical "1" output for each bit position where the bit values of ip1 and ip2 are different. Thus, gate 12 provides a logical "1" output when a logical "1" appears in ip1 and a logical "0" appears in ip2, or when a logical "1" in ip2 and a logical "0" appears in ip1. Gate 12, provides a logical "0" output in all other conditions, namely when corresponding bits of both ip1 and ip2 are either logical "0" or logical "1". In the example where a match was found between the five most significant bits of ip1 and ip2, the five most significant bits at the output of Exclusive-OR gate 12 are logical "0"s; the sixth bit of gate 12 is a logical "1" because there is no match (in the example) of the corresponding bits of ip1 and ip2.

Indices n1 and n2 are equal in length and comprise a binary code representative of the length w of the respective prefix p1 and p2 in the form of [0:m−1] where m=LOG(W+1). Indices n1 and n2 are input to comparator circuit 14 and Exclusive-OR gate 16. Gate 14 is a comparator gate similar to gate 10, and gate 16 is a bit-wise Exclusive-OR gate, similar to gate 12. In addition, n1 is input to decoder 18 and n2 is input to decoder 20. Each decoder 18 and 20 decodes the respective n index to produce a W-bit word whose first or most significant w bits (equal in length to the corresponding prefix p) are logical "1"s, and the remaining (W-w) bits are logical "0"s. Hence, the output of each decoder 18 and 20 represents the length of the corresponding prefix p1 or p2.

The outputs of decoders 18 and 20 are processed through bit-wise AND gate 22 to provide a binary word that is W-bits long and whose w most significant bits are "1"s representing the length of the shortest of p1 and p2. AND gate 24 receives the output bits of gates 12 and 22. The most significant "1" in the output from gate 12 represents the first bit that prefixes p1 and p2 do not match, and the length of the string of "1" bits from gate 22 represents the shortest length of p1 and p2. Hence, the first "1" bit output from AND gate 24 is indicative of the first or most significant bit position that p1 and p2 do not exactly match, where both p1 and p2 are at least that long. In the example where p1 is greater than p2 and match over five bits, AND gate 22 will provide a logical "1" at the sixth bit position matching the logical "1" bit from gate 12 to provide a logical "1" bit at the sixth bit position from AND gate 24. Consequently, a logical "1" bit is passed by OR gate 26 at the sixth bit position to a first input of AND gate 28. If comparator 10 has indicated that ip1 is greater than ip2, gate 10 will provide a "1" bit to the second input of AND gate 28, thereby providing an output from OR gate 30 indicating the value of p1 is greater than p2.

The output from OR gate 26 is inverted through NOT gate 32 to a first input of each gate 34 and 40. If p1 and p2 are equal, both in length and in value, the bit-wise outputs of Exclusive-OR gates 12 and 16 are both strings of "0"s, providing logical "1"s through NOT gates 32 and 38 to operate gate 40 to set a logical "1" output at the "equal" output.

If one prefix p1 is greater than p2 due to length, the OR gate 30 will be operated through AND gate 34. For example, if p1 is eight bits "11001010" and p2 is seven bits "1100101", ip1 is 11001010xx and ip2 is "1100101xxx", where W=10 and x is an empty bit. The absence of a logical "1" in the eighth bit position of ip2 causes Exclusive-OR gate to provide a sting of logical "0"s to AND gate 24. Consequently, AND gate 24 and OR gate 26 provide a logical "0" to NOT gate 32 which provides a "1" bit to the first input of gate 34. Comparator 14 provides a "1" bit, indicative that n1 is greater than n2 to operate gate 34 to provide a "1" output at the "greater" output of OR gate 30.

Triangle AND gate 44 receives an inverted input from Exclusive-OR gate 12 and NOT gate 42 to provide an output to bit-wise AND gate 46. The input to gate 46 from gate 12 is a string of logical "1" s (having been inverted from a string of logical "0"s by NOT gate 42) indicating a match between the corresponding bits of ip1 and ip2. The second input to gate 46 is received from gate 22, whose string of "1" bits is indicative of the common length of p1 and p2. Therefore, the output of AND gate 46 is representative of the common subprefixes of p1 and p2, with the least significant "1" bit in the bit string being representative of the longest common subprefix of p1 and p2. In the example where p1 is "11001010" and p2 is "1100101", a ten bit eqmask will be "1111111000" indicating common prefixes of 1, 11, . . . , and 1100101, with 1100101 being the longest matching prefix.

The triangle(AND) gate 44 has an interface represented by module TRIANGLE[W,@]();

INPUT[0:W-1]x;

output [0:W-1]y;

assign y[0]=x[0];

assign y[1]=x[0]@x[1];

assign y[2]=x[0]@x[1]@x[2];

. . .

assign y[i]=x[0]@x[1]@ . . . @x[i];

. . .

assign y[W-1]=x[0]@ x[1]@. . . @ x[W-1];

endmodule where @ is an associative and commutative operation such as an OR, AND or XOR (Exclusive-OR) function. Thus, x@(y@z)=(x@y)@z, and x@y=y@x.

The triangle gate shown in FIGS. 2 and 3 reduces the operator from a dimension of 2·W−1 or 2·W to a dimension of W. This reduction guarantees that the number of @-th gates in final circuit will be at most 2·W and depth of the circuit will be at most 2·LOG(W)−C, where C is a constant, such as 1. Thus, the number of gates of the comparator circuit of FIG. 1 is a linear function of dimension W, and the depth of the circuit is 2·LOG(W)−C, where C is preferably 1.

In preferred embodiments, the invention is implemented as an integrated circuit. The invention might also be implemented in a computer readable program embedded in a computer usable medium to cause a computer to identify common prefixes to two binary words and to carry out the processes of the invention.

Although the present invention has been described with reference to preferred embodiments, workers skilled in the art will recognize that changes may be made in form and detail without departing from the spirit and scope of the invention.

What is claimed is:

1. Apparatus for identifying a longest common subprefix of two binary prefixes p1 and p2 comprising:
    means defining p1 as binary word ip1, n1 and p2 as binary word ip2, n2, where ip1 and ip2 are of equal length and each is an extension of the respective p1 and p2, and n1 and n2 represent the length of p1 and p2, respectively;
    a comparator for responsive to ip1 and ip2 to provide a first bit string identifying bits of ip1 and ip2 that match in value;
    a decoder responsive to n1 and n2 to form a second bit string identifying the length of the shortest of p1 and p2; and
    a processor responsive to the first and second bit strings to derive a mask having a consecutive string of most significant bits representing the matching subprefixes of p1 and p2.

2. The apparatus of claim 1, wherein the comparator includes an Exclusive-OR gate responsive to the bits of ip1 and ip2 to form the first bit string.

3. The apparatus of claim 2, wherein the decoder includes:
    a first decoder responsive to n1 to derive a string a bits having a predetermined logic value corresponding to the number of bits in p1,
    a second decoder responsive to n2 to derive a string a bits having the predetermined logic value corresponding to the number of bits in p2, and
    an AND gate responsive to the first and second decoders to form the second bit string.

4. The apparatus of claim 3, wherein the processor includes an AND gate responsive to the first and second bit strings to provide the mask.

5. The apparatus of claim 1, including:
    a second comparator for comparing the values of the bits of ip2 to the values of the bits of ip1, and
    a first output responsive to the second comparator for identifying that a bit of ip1 has a greater value than the corresponding bit of ip2 following matching strings of equal value.

6. The apparatus of claim 5, wherein the decoder further identifies whether the length of p1 is greater than the length of p2, and the first output is further responsive to the second comparator identifying that the values of the bits of ip2 match the values of the corresponding bits of ip1 and to the decoder identifying that p1 is longer than p2.

7. The apparatus of claim 5, further including:
    a second output responsive to the second comparator for identifying that ip1=ip2.

8. The apparatus of claim 7, wherein the second comparator compares the values of the bits of ip2 to the values of the bits of ip1, and the decoder identifies whether the length of p1 is equal to the length of p2,
    the second output being responsive to the second comparator and the decoder to identify that p1=p2 if the values of the bits of ip2 match the values of the corresponding bits of ip1 and the length of p1 is equal to the length of p2.

9. A process for identifying a longest common subprefix of two binary prefixes p1 and p2 comprising steps of:
    a) defining p1 as ip1, n1 and p2 as ip2, n2, where ip1 and ip2 are of equal length and each is an extension of the respective p1 and p2, and n1 and n2 represent the length of p1 and p2;
    b) processing ip1 and ip2 to form a first bit string having a first logical bit value corresponding to bits of ip1 and ip2 that match in value;
    c) decoding n1 and n2 to form a second bit string having the first logical value matching the length of the shortest of p1 and p2; and
    d) processing the bit strings produced by steps (b) and (c) to derive a mask having a consecutive string of most significant bits representing the matching subprefixes of ip1 and ip2.

10. The process of claim 9, wherein step (b) includes:
    b1) performing an Exclusive-OR operation on the bits of ip1 and ip2 to form the first bit string.

11. The process of claim 10, wherein step (c) includes steps of:
    c1) decoding n1 to derive a string a bits having a predetermined logic value corresponding to the number of bits in p1,
    c2) decoding n2 to derive a string a bits having the predetermined logic value corresponding to the number of bits in p2, and
    c3) performing an AND operation on the bits of the strings derived in steps (c1) and (c2) to form the second bit string.

12. The process of claim 11, wherein step (d) includes:
    d1) performing an AND operation on the first and second bit strings.

13. The process of claim 9, further including steps of:
    e) comparing ip1 and ip2 to identify whether p1>p2.

14. The process of claim 13, wherein step (e) is performed by:
    e1) comparing the values of the bits of ip2 to the values of the bits of ip1,
    e2) comparing n1 and n2 to identify whether the length of p1 is greater than the length of p2, and
    e3) identifying that p1>p2 if a bit of ip1 has a greater value than the corresponding bit of ip2 following matching strings of equal value, or if the values of the bits of ip2 match the values of the corresponding bits of ip1 and p1 is longer than p2.

15. The process of claim 13, further including steps of:
    f) comparing ip1 and ip2 to identify whether p1=p2.

16. The process of claim 15, wherein step (f) includes steps of:
    f1) comparing the values of the bits of ip2 to the values of the bits of ip1,
    f2) comparing n1 and n2 to identify whether the length of p1 is equal to the length of p2, and
    f3) identifying that p1=p2 if the values of the bits of ip2 match the values of the corresponding bits of ip1 and the length of p1 is equal to the length of p2.

17. A computer usable medium having a computer readable program embedded therein for addressing data to identify common subprefixes of two binary prefixes p1 and p2 by a computer, the computer readable program in the computer readable medium comprising:

first computer readable program code for causing the computer to define p1 as binary word ip1, n1 and p2 as binary word ip2, n2, where ip1 and ip2 are of equal length and each is an extension of the respective p1 and p2, and n1 and n2 represent the length of p1 and p2, respectively;

second computer readable program code for causing the computer to process ip1 and ip2 to form a first bit string identifying bits of ip1 and ip2 that match in value;

third computer readable program code for causing the computer to decode n1 and n2 to form a second bit string identifying the length of the shortest of p1 and p2; and fourth computer readable program code for causing the computer to process the first and second bit strings to derive a mask having a consecutive string of most significant bits representing the matching subprefixes of ip1 and ip2.

18. The computer usable medium of claim 17, wherein the second computer readable program code includes:

fifth computer readable program code for causing the computer to perform an Exclusive-OR operation on the bits of ip1 and ip2 to form the first bit string, and the third computer readable program code includes:

sixth computer readable program code for causing the computer to decode n1 to derive a third string a bits having a predetermined logic value corresponding to the number of bits in p1, seventh computer readable program code for causing the computer to decode n2 to derive a fourth string of bits having the predetermined logic value corresponding to the number of bits in p2, and eighth computer readable program code for causing the computer to perform an AND operation on the bits of the third and fourth bit strings derived to form the second bit string.

19. The computer usable medium of claim 17, further including:

ninth computer readable program code for causing the computer to compare ip1 and ip2 to identify whether p1>p2.

20. The computer usable medium of claim 19, further including:

tenth computer readable program code for causing the computer to compare ip1 and ip2 to identify whether p1=p2.

* * * * *